US010385167B2

(12) United States Patent
Müller et al.

(10) Patent No.: US 10,385,167 B2
(45) Date of Patent: Aug. 20, 2019

(54) PROCESS FOR THE SYNTHESIS OF POLYOXAZOLIDINONE COMPOUNDS WITH HIGH STABILITY

(71) Applicant: Covestro Deutschland AG, Leverkusen (DE)

(72) Inventors: Thomas Ernst Müller, Aachen (DE); Christoph Gürtler, Köln (DE); Susmit Basu, Surrey (GB); Claudine Rangheard, Aachen (DE); David Rivillo, Barrio Floresta (BR); Walter Leitner, Aachen (DE); Burkhard Köhler, Zierenberg (DE)

(73) Assignee: Covestro Deutschland AG, Leverkusen (DE)

( * ) Notice: Subject to any disclaimer, the term of this patent is extended or adjusted under 35 U.S.C. 154(b) by 141 days.

(21) Appl. No.: 15/548,817

(22) PCT Filed: Feb. 9, 2016

(86) PCT No.: PCT/EP2016/052689
§ 371 (c)(1),
(2) Date: Aug. 4, 2017

(87) PCT Pub. No.: WO2016/128380
PCT Pub. Date: Aug. 18, 2016

(65) Prior Publication Data
US 2018/0022871 A1 Jan. 25, 2018

(30) Foreign Application Priority Data
Feb. 13, 2015 (EP) .................... 15154977

(51) Int. Cl.
| C08G 18/00 | (2006.01) |
| C08G 71/00 | (2006.01) |
| C08G 18/71 | (2006.01) |
| C08G 18/76 | (2006.01) |
| C08G 18/80 | (2006.01) |
| C08G 18/16 | (2006.01) |
| C08G 18/20 | (2006.01) |
| C08G 18/28 | (2006.01) |
| C08G 71/04 | (2006.01) |

(52) U.S. Cl.
CPC ........... *C08G 71/00* (2013.01); *C08G 18/003* (2013.01); *C08G 18/168* (2013.01); *C08G 18/2063* (2013.01); *C08G 18/282* (2013.01); *C08G 18/71* (2013.01); *C08G 18/7621* (2013.01); *C08G 18/8064* (2013.01); *C08G 71/04* (2013.01)

(58) Field of Classification Search
CPC combination set(s) only.
See application file for complete search history.

(56) References Cited

U.S. PATENT DOCUMENTS

| 3,415,901 | A | * | 12/1968 | Schmidle | ............. | C07D 413/04 |
| | | | | | | 525/453 |
| 3,458,527 | A | * | 7/1969 | Schmidle | ............. | C07D 413/04 |
| | | | | | | 524/95 |
| 3,687,897 | A | * | 8/1972 | Clarke | ................ | C07D 263/20 |
| | | | | | | 528/51 |
| 5,324,797 | A | | 6/1994 | Ishii et al. | | |
| 9,458,281 | B2 | | 10/2016 | Mueller et al. | | |
| 2010/0227090 | A1 | * | 9/2010 | Liao | .................... | C08G 18/003 |
| | | | | | | 428/35.8 |
| 2013/0269985 | A1 | * | 10/2013 | Tahara | ................... | C08L 79/04 |
| | | | | | | 174/251 |
| 2015/0291726 | A1 | | 10/2015 | Mueller et al. | | |

OTHER PUBLICATIONS

Dyen, M. E. et al; "2-Oxazolidones"; Chem. Rev.; pp. 197-246; 67; Fels Research Institute and Department of Chemistry, Temple University, Philadelphia PA.

Iwakura, Y. et al; "Polyoxazolidones Prepared from Bisurethans and Bisepoxides"; Journal of Polymer Science: Part A-1; (1966); pp. 751-760; vol. 4; Department of Synthetic Chemistry, Faculty of Engineering, University of Tokyo, Tokyo, Japan.

\* cited by examiner

*Primary Examiner* — Michael L Leonard
(74) *Attorney, Agent, or Firm* — N. Denise Brown

(57) ABSTRACT

The present invention relates to polyoxazolidinone compounds, a method for the production of polyoxazolidinone compounds, comprising the step of reacting a biscarbamate compound with a bisepoxide compound in the presence of a mono-carbamate, a mono-isocyanate and/or a mono-epoxide compound as chain regulator and a suitable base having a $pK_b$ value of $\leq 9$ as catalyst. The invention further relates to the use of polyoxazolidinone compounds with high thermal stability.

19 Claims, No Drawings

PROCESS FOR THE SYNTHESIS OF POLYOXAZOLIDINONE COMPOUNDS WITH HIGH STABILITY

CROSS-REFERENCE TO RELATED APPLICATIONS

This Application is a National Phase Application of PCT/EP2016/052689, filed Feb. 9, 2016, which claims priority to European Application No. 15154977.1 filed Feb. 13, 2015, each of which is being incorporated herein by reference.

FIELD

The present invention relates to polyoxazolidinone compounds, a method for the production of polyoxazolidinone compounds, comprising the step of reacting a biscarbamate compound with a bisepoxide compound in the presence of a mono-carbamate, a mono-isocyanate and/or a mono-epoxide compound as chain regulator and a suitable base having a $pK_b$ value of $\leq 9$ as catalyst. The invention further relates to the use of polyoxazolidinone compounds with high thermal stability.

BACKGROUND

Oxazolidinones are widely used structural motifs in pharmaceutical applications and the cycloaddition of epoxides and isocyanates seems to be a convenient one-pot synthetic route to it. Expensive catalysts, reactive polar solvents, long reaction times and low chemoselectivities are common in early reports for the synthesis of oxazolidinones (M. E. Dyen and D. Swern, Chem. Rev., 67, 197, 1967). Due to these disadvantages there was the need for alternative methods for the production of oxazolidinones especially for application of oxazolidinones as structural motif in polymer applications.

EP 0 530 812 A1 discloses the preparation of thermosetting resinous compositions by the reaction of the monofunctional ethyl carbamate with mono- or poly-functional epoxides at a reaction temperature of 130° C. The formed oxazolidinone moiety is a terminal and/or pendant group, which reacts in situ with amines to form polymeric urea repeating units in a thermosetting polymer. The oxazolidinone intermediate comprises an N—H functional group, which reduces the thermal and chemical stability of the oxazolidinone intermediate. The thermosetting polymer formed in the reaction with amines does not soften or melt.

European Patent Application No. 12192611.7 relates to a method for the production of oxazolidinone and polyoxazolidinone compounds, comprising the step of reacting an isocyanate compound with an epoxide compound in the presence of a Lewis acid catalyst. An antimony catalyst ($Ph_4SbBr$) was used as Lewis acidic catalyst, which has certain toxicity. The isocyanate has to be synthesised in a preceding step and requires additional safety measures due to the high reactivity of isocyanates. A mixture of the 5-oxazolidinone and 4-oxazolidinone regioisomers was obtained, which gives a less defined product mixture. The reaction of biscarbamates with bisepoxides in the presence of a base has not been disclosed in this patent application.

US 2013/0269985 describes the synthesis of polyoxazolidinones from bisepoxides and biscarbamates by using basic catalysts. The polyoxazolidinone is carbamate terminated which gives rise to thermal instability. The use of a chain regulator has not been disclosed.

The paper J. Polym. Sci. 4 (1966) 751-760 discloses polyoxazolidinones prepared from bisurethanes (biscarbamates) and bisepoxides. Although a high catalyst concentration of 18 mol % was used, long reaction times of 5-30 h were required. The polymers precipitated before a high molecular weight was reached and gradually decomposed at 250-300° C. The homo-polymerisation of the epoxide was observed as side reaction. The use of a chain regulator has not been disclosed.

Objective of the present invention was therefore to identify polyoxazolidinones having a higher thermostability than the already known polyoxazolidinones and which are useful as thermoplastic material. Furthermore a method for the preparation of these highly thermostable polyoxazolidinones, which avoids the use of free isocyanates, the use of toxic Lewis acid catalysts and the use of high catalyst concentrations, is an objective of the present invention.

SUMMARY

Surprisingly it has been found polyoxazolidinone compounds prepared in the presence of a mono-carbamate, a mono-isocyanate and/or a mono-epoxide compound have a high thermal stability. The inventive polyoxazolidinone compounds may be prepared by the reaction of biscarbamates and bisepoxides in the presence of a compound comprising a mono-carbamate group, a mono-isocyanate group and/or a mono-epoxide group and a base having a $pK_b$-value of $\leq 9$. The polyoxazolidinones prepared according to the invention exhibit a high thermal stability. These compounds have a decomposition temperature up to 392° C.

The subject matter of the invention is therefore a polyoxazolidinone compound according to formula (I), formula (II) and/or formula (III)

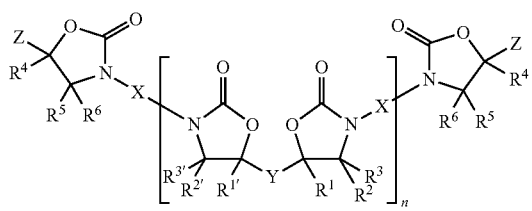

(I)

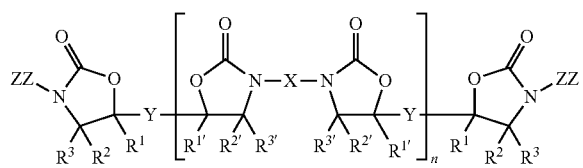

(II)

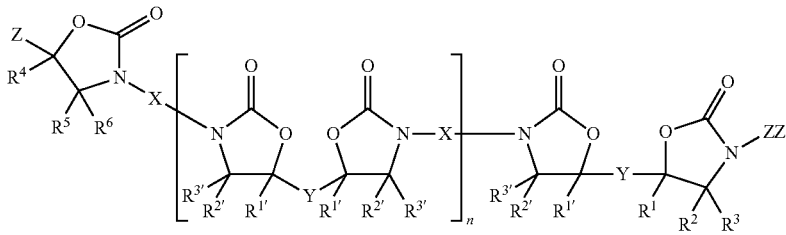

wherein X, Y, Z, ZZ, R1, R1', R2, R2', R3, R3', R4, R5 and R6 have the meanings given further below.
X, Y, Z, ZZ, R1, R1', R2, R2', R3, R3', R4, R5, R6 can be equal or different to each other, and
n is an integer of ≥1, more preferably ≥2 and ≤10000, even more preferred ≥3 and ≤2000 and most preferred ≥5 and ≤500.

DETAILED DESCRIPTION

The polyoxazolidinone compounds according to formula (I), (II) and/or (III) exhibit excellent thermostability. The thermostability of the polyoxazolidinones can be characterized by thermogravimetric analysis (TGA) and Differential Scanning calorimetry (DSC) as described below in the methods.

As used herein, the term "polyoxazolidinone compound" is meant to denote compounds containing at least two oxazolidinone groups in the molecule according to formula (I), (II) and/or (III) as described above. The polyoxazolidinone compounds are obtainable by the reaction of a biscarbamate with a bisepoxide.

X represents methylene, dimethylene, trimethylene, tetramethylene, pentamethylene, hexamethylene, octamethylene, decamethylene, dodecamethylene optionally substituted with heteroatoms containing groups, cyclohexylene, phenylene, diphenylene, dimethyl phenylene optionally comprising heteroatoms, 2-methylpentamethylene, 2,2,4-trimethyl-hexamethylene, dodecanemethylene, 1,2-cyclohexylene, 1,3-cyclohexylene, 1,4-cyclohexylene, 5-(1-methylene-(1,3,3-trimethylcyclohexane)), all regioisomers of methylene biscyclohexylene, all regioisomers of methylenebisphenylene, methylenebis-(3,3'-dimethylcyclohexane1,4-diyl), propane-2,2-diylbis(cyclohexane-4,1-diyl), propane-2,2-diyl-bis-4,1-phenylene, polyhexamethylene, tolylene, poly(propylene glycol) tolylene, poly(ethylene adipate) tolylene, 2,4,6-trimethyl-1,3-phenylene, 4-chloro-6-methyl-1,3-phenylene, poly[1,4-phenylene], co-poly(1,4-butanediol)], poly(tetrafluoroethylene oxide-co-difluoromethylene oxide), 1,3-bis(1-methylethyl)benzene, 3,3'-dimethyl-4,4'-biphenylene, naphthalene, 1,2-phenylene, 1,3-phenylene, 1,4-phenylene 2,4- or 2,5- or 2,6-tolylene or mixtures of these isomers, methylene 4,4'- or 2,4'- or 2,2'-bisphenylene or mixtures of these isomers, 4,4'-, 2,4'- or 2,2'-2,2-diphenylpropane-p-xylylene and α,α,α',α'-tetramethyl-m- or -p-xylylene and most preferably 4,4'-methylenebis(4,1-phenylene) or 2, 4-substituted tolylene.

Y represents methylene, dimethylene, trimethylene, tetramethylene, pentamethylene, hexamethylene, heptamethylene, octamethylene, polyethylene, polyethyleneglycol, 1,2-cyclohexylene, 1,3-cyclohexylene, 1,4-cyclohexylene, 1,2-phenylene, 1,3-phenylene, 1,4-phenylene, 1,2-tolylene, 1,3-tolylene, 1,4-tolylene, 4,4'-methylenebis(4,1-phenylene), 4,4'-methylenebis(cyclohexane-4,1-diyl), 4,4'-(pro- pane-2,2-diyl)bis(4,1-phenylene), propane-2,2-diyl-bis(cyclohexane-4,1-diyl) or Y can be represented by formula IV

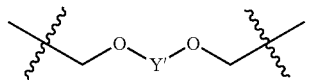

wherein Y' is represented by methylene, dimethylene, trimethylene, tetramethylene, pentamethylene, hexamethylene, heptamethylene, octamethylene, polyethylene, polyethyleneglycol, 1,2-cyclohexylene, 1,3-cyclohexylene, 1,4-cyclohexylene, 1,2-phenylene, 1,3-phenylene, 1,4-phenylene, 1,2-tolylene, 1,3-tolylene, 1,4-tolylene, 4,4'-methylenebis(4,1-phenylene), 4,4'-methylenebis(cyclohexane-4,1-diyl), 4,4'-(propane-2,2-diyl)bis(4,1-phenylene), propane-2,2-diyl-bis(cyclohexane-4,1-diyl), or 4,4'-(3,3,5-trimethylcyclohexyliden)bisphenyl and most preferably Y' is represented by 4,4'-(propane-2,2-diyl)bis(4,1-phenylene) or 1,3-phenylene Z represents hydrogen, methyl, ethyl, butyl, propyl, hexyl, heptyl, octyl, nonyl, decyl, dodecyl, C10-C18 alpha-olefins, ethylene, phenyl, unsaturated fatty acid C1-C18 alkyl esters, methylene methyl ether, methylene ethyl ether, methylene propyl ether, methylene butyl ether, methylene pentyl ether, methylene hexyl ether, methylene cyclohexyl ether, methylene octyl ether, methylene 2-ethylhexyl ether, methylene C10-C18 alkyl ether, methylene allyl ether, methylene benzyl ether, methylene phenyl ether, methylene 4-tert-butylphenyl ether, methylene 1-naphthyl ether, methylene 2-naphthyl ether, methylene 2-chlorophenyl ether, methylene 4-chlorophenyl ether, methylene 4-bromophenyl ether, methylene 2,4,6-trichlorophenyl ether, methylene 2,4,6-tribromophenyl ether, methylene pentafluorophenyl ether, methylene o-cresyl ether, methylene m-cresyl ether, methylene p-cresyl ether, methylene acetate, methylene cyclohexylcarboxylate, methylene benzoate, and N-methylene phthalimide. Most preferably hydrogen, methyl, ethyl, phenyl, methylene butyl ether, methylene benzyl ether, methylene phenyl ether, methylene p-tolyl ether, methylene 4-tert-butylphenyl ether. A mixture of the aforementioned Z substituents can also be used.

ZZ represents methyl, ethyl, n-propyl, isopropyl, n-butyl, isobutyl, tert-butyl, n-pentyl, n-hexyl, cyclohexyl, ω-chlorohexamethylene, n-heptyl, n-octyl, iso-octyl, 2-ethyl hexyl, 2-norbornyl methyl, nonyl, 2,3,4-trimethylcyclohexyl, 3,3,5-trimethylcyclohexyl, decyl, undecyl, dodecyl, tridecyl, tetradecyl, pentadecyl, hexadecyl, octadecyl, stearyl, 3-butoxypropyl, 3-(2-ethylhexyloxy)-propyl, 6-chlorohexyl, benzyl, phenyl, ortho-, meta-, para-tolyl, dimethylphenyl, 4-pentylphenyl isocyanate, 4-cyclohexylphenyl, 4-dodecylphenyl, ortho-, meta-, para-methoxyphenyl, chlorophenyl (2,3,4-isomers), the different dichlorophenyl isomers, 4-nitrophenyl, 3-trifluoromethylphenyl, 1-naphthyl. Most preferably benzyl, phenyl, ortho-, meta-, para-tolyl, dimethylphenyl, 4-cyclohexylphenyl and ortho-, meta-, para-methoxyphenyl. A mixture of two or more of the aforementioned ZZ substituents can also be used.

R1, R1', R2, R2', R3, R3', R4, R5, R6 independent of one another represent hydrogen, chloride, bromide, fluoride, methyl, ethyl, propyl, n-propyl, isopropyl, n-butyl, isobutyl, 2-butyl, tert-butyl, hexyl, methoxy, ethoxy, butoxy, phenyl, methoxyphenyl, chlorophenyl, bromophenyl, nitrophenyl, cyclobutyl, cyclopentyl, cyclohexyl, cycloheptyl, and most preferably hydrogen.

Another subject-matter of the invention is a method for the production of polyoxazolidinone compounds comprising the reaction of at least one biscarbamate with at least one bisepoxide, characterized in that the reaction takes place in the presence of
- A) a compound comprising a mono-carbamate group, a mono-isocyanate group and/or a mono-epoxide group, preferably a compound comprising a mono-carbamate group and/or a mono-epoxide group, and
- B) a base having a $pK_b$-value of $\leq 9$ preferably of $\leq 7$, most preferred $\leq 5.3$
and, optionally,
- C) at a temperature of $\geq 100°$ C., more preferred $\geq 120°$ C. and most preferred $\geq 140°$ C.

In an alternative embodiment of the invention the method for the production of polyoxazolidinone compounds comprises the reaction of at least one diisocyanate compound with at least one bisepoxide compound, characterized in that the reaction takes place in the presence of
- A) a compound comprising a mono-carbamate group, a mono-isocyanate group and/or a mono-epoxide group, preferably a compound comprising a mono-isocyanate group and/or a mono-epoxide group, and
- B) a base having a $pK_b$-value of $\leq 9$ preferably of $\leq 7$, most preferred $\leq 5.3$
and, optionally,
- C) at a temperature of $\geq 100°$ C., more preferred $\geq 120°$ C. and most preferred $\geq 140°$ C.

Biscarbamates within the scope of the invention are compounds containing two carbamate groups in the molecule, preferably compounds of the formula (V) below:

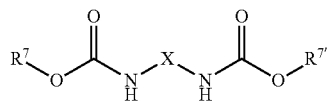

(V)

Wherein
X has the above meaning and
R7 and R7' independently of one another represent a linear or branched C1-C22 alkyl group optionally containing heteroatoms a mono- or poly-substituted C6-C18 aryl group optionally containing heteroatoms, or a saturated or unsaturated 4- to 7-membered ring or polycyclic system optionally containing heteroatoms or a group of formula (VI)

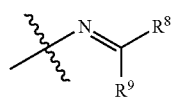

(VI)

Wherein R8 and R9 independently from each other represent a C1-C4 alkyl group or a C6-C10 aryl group of are members of an alicyclic C5-C12 ring.

Preferably, R7 and R7' are methyl, ethyl, n-propyl, isopropyl, n-butyl, isobutyl, 2-butyl, tert-butyl, all isomers of pentyl and hexyl, phenyl, tolyl, naphthyl, trifluoromethyl, 2,2,2-trifluoroethyl, pentafluoroethyl, 1,1,1,3,3,3-hexafluoro-2-propyl, more preferably methyl, ethyl, isopropyl, n-butyl and 2-butyl.

Examples of suitable biscarbamate compounds of the above formula are compounds selected from the group consisting of N,N'-tetramethylene biscarbamate, N,N'-hexamethylene biscarbamate, N,N'-(2-methylpentamethylene) biscarbamate, N,N'-2,2,4-trimethyl-hexamethylene biscarbamate, N,N'-dodecanemethylene biscarbamate, N,N'-cyclohexane-1,4-biscarbamate, N,N'-isophorone biscarbamate, N,N'-(4,4'-methylenebis(cyclohexane-4,1-diyl) biscarbamate, N,N'-diphenylmethane biscarbamate, N,N'-(4,4'-methylenebis(2-methylcyclohexane-4,1-diyl))bis carbamate, (−)-N,N'-2,2-dicyclohexylpropane-4,4'-biscarbamate, N,N'-poly(hexamethylene biscarbamate), N,N'-octamethylene biscarbamate, N,N'-tolylene-α,4-biscarbamate, N,N'-poly(propylene glycol) tolylene-2,4-biscarbamate, N,N'-poly(ethylene adipate) tolylene-2,4-biscarbamate, N,N'-2,4,6-trimethyl-1,3-phenylene biscarbamate, N,N'-(4-chloro-6-methyl-1,3-phenylene) biscarbamate, N,N'-(poly[1,4-phenylene biscarbamate-co-poly(1,4-butanediol)]) biscarbamate, poly(tetrafluoroethylene oxide-co-difluoromethylene oxide) α,ω-biscarbamate, N,N'-butane-1,4-diylbiscarbamate, N,N'-(1-methylethyl)benzene-1,3-biscarbamate, N,N'-3,3'-dimethyl-4,4'-biphenylene biscarbamate, N,N'-naphthalene-1,5-biscarbamate, N,N'-1,3-phenylene biscarbamate N,N'-benzene-1,4-biscarbamate, N,N'-2,4- or N,N'-2,5- or N,N'-2,6-biscarbamatotoluene or mixtures of these isomers, N,N'-4,4'-, N,N'-2,4'- or N,N'-2,2'-biscarbamatodiphenylmethane or mixtures of these isomers, N,N'-4,4'-, N,N'-2,4'- or N,N'-2,2'-biscarbamato-2,2-diphenylpropane-p-xylene and/or α,α,α',α'-tetramethyl-m- or -p-xylene biscarbamate, preferably O,O'-dimethyl-toluene-2,4-dicarbamate, O,O'-Dimethyl-4,4'-methylendiphenyl-1,1'-dicarbamate, O,O'-diethyl-toluene-2,4-dicarbamate, O,O'-Diethyl-4,4'-methylendiphenyl-1,1'-dicarbamate, O,O'-di-2-butyl-toluene-2,4-dicarbamate, and/or O,O'-Di-2-butyl-4,4'-methylendiphenyl-1,1'-dicarbamate.

In an alternative embodiment of the invention a mixture of two or more of the above mentioned biscarbamates can also be used.

Biscarbamates can be obtained from the corresponding diisocyanates by reaction with the corresponding alcohol. The reaction of the diisocyanate with the alcohol can be performed in the same reactor as the polymerisation reaction or in a separate reactor.

Diisocyanates within the scope of the invention are compounds containing two or more isocyanate groups in the molecule.

Examples of diisocyanate compounds are tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocymatocyclohexane, 3-isocyanatomethyl-3,3,5-trimethylcyclohexyl isocyanate (isophorone diisocyanate, IPDI), 4,4'-diisocyanatodicyclohexylmethane ($H_{12}$-MDI), 4,4'-diisocyanato-3,3'-dimethyldicyclohexylmethane, 4,4'-diisocyanato-2,2-dicyclohexylpropane, poly(hexamethylene diisocyanate), octamethylene diisocyanate, tolylene-α,4-diisocyanate, poly(propylene glycol) tolylene-2,4-diisocyanate, poly(ethylene adipate) tolylene-2,4-diisocyanate, 2,4, 6-trimethyl-1,3-phenylene diisocyanate, 4-chloro-6-methyl-1,3-phenylene diisocyanate, poly[1,4-phenylene diisocyanate-co-poly(1,4-butanediol)] diisocyanate, poly(tetrafluoroethylene oxide-co-difluoromethylene oxide) α,ω-diisocyanate, 1,4-diisocyanatobutane, 1,8-diisocymatooctane, 1,3-bis(1-isocyanato-1-methylethyl)benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- or 2,6-diisocyanatotoluene (TDI) or mixtures of these isomers, 4,4'-, 2,4'- or 2,2'-diisocyanatodiphenylmethane (MDI) or mixtures of these isomers, 4,4'-, 2,4'- or 2,2'-diisocyanato-2,2-diphenylpropane-p-xylene diisocyanate, α,α,α',α'-tetramethyl-m- or -p-xylene diisocyanate (TMXDI), mixtures thereof and biurets, isocyanurates, carbamates or uretdiones of the aforementioned isocyanates.

Preferred diisocyanates are hexamethylene diisocyanate (HDI), 3-isocyanatomethyl-3,3,5-trimethylcyclohexyl isocyanate (isophorone diisocyanate, IPDI), 4,4'-diisocyanatodicyclohexylmethane ($H_{12}$-MDI), 2,4- or 2,5- or 2,6-diisocyanatotoluene (TDI) or mixtures of these isomers, 4,4'-, 2,4'- or 2,2'-diisocyanatodiphenylmethane (MDI) or mixtures of these isomers.

A mixture of two or more of the aforementioned diisocyanates can also be used.

Bisepoxides within the scope of the invention are compounds containing two epoxy groups in the molecule, preferably compounds of the formula (VII) below:

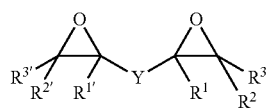

(VII)

wherein
Y, R1, R1', R2, R2', R3, and R3' have the above meaning.

Preferred substituted bisepoxide compounds of the above formula are bisepoxide compounds, in which Y represents C1-C22 linear or branched alkoxy group, C5-C22 cycloalkoxy, C6-C18 aroxy substituent.

Preferred cycloaliphatic bisepoxides are selected from the group vinylcyclohexene dioxide, dicyclopentadiene dioxide, 3,4-epoxy-cyclohexyl-6-methyl 3,4-epoxycyclohexylcarboxylate, limonene dioxide.

More preferred bisepoxide compounds of the above formula (VII) are bisepoxide compounds selected from the group consisting of resorcinol diglycidyl ether, neopentyl glycol diglycidyl ether, 1,6-hexanediol diglycidyl ether, 1,4-butanediol diglycidyl ether, hydrogenated bisphenol-A diglycidyl ether, bisphenol-A diglycidyl ether, bisphenol-F diglycidyl ether, bisphenol-S digylcidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, 4,4'-(3,3,5-trimethylcyclohexyliden)bisphenyl diglycidylether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether and/or diglycidyl isophthalate preferably resorcinol diglycidyl ether and/or bisphenol-A-diglycidylether.

In an alternative embodiment of the invention a mixture of two or more of the above mentioned bisepoxides can also be used.

The compounds comprising a mono-carbamate group, a mono-epoxide group and/or a mono-isocyanate group are also denoted as "chain regulator" according to the invention. Compounds comprising a mono-carbamate and/or a mono-epoxide group are preferred compounds according to the invention.

Compounds comprising a mono-carbamate group within the scope of the invention are compounds containing one carbamate group in the molecule, preferably compounds of the formula (VIII):

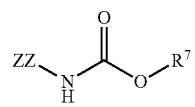

(VIII)

Wherein
ZZ and R7 have the above meaning.

Preferably ZZ represents a C1-C22 linear or branched alkyl group, optionally comprising heteroatoms and/or optionally substituted with a heteroatom containing group; C5-C22 cycloalkyl group, optionally comprising heteroatoms; C6-C18 aryl group, optionally comprising heteroatoms; and/or optionally substituted with a heteroatom containing group;

Preferably, R7 is methyl, ethyl, n-propyl, isopropyl, n-butyl, isobutyl, 2-butyl, tert-butyl, all isomers of pentyl and hexyl, phenyl, tolyl, naphthyl, trifluoromethyl, 2,2,2-trifluoroethyl, pentafluoroethyl, 1,1,1,3,3,3-hexafluoro-2-propyl, more preferably methyl, ethyl, isopropyl, n-butyl and 2-butyl.

Suitable mono-carbamate compounds of the above formula (VIII) are for example compounds selected from the group consisting of N-phenyl carbamate, N-(o-tolyl) carbamate, N-(p-tolyl) carbamate, N-(4-chlorophenyl) carbamate, N-(1-naphthyl) carbamate, N-(2-naphthyl) carbamate, N-cyclohexyl carbamate, N-methyl carbamate, N-ethyl carbamate, N-(n-propyl) carbamate, N-isopropyl carbamate, N-butyl carbamate, N-pentyl carbamate N-hexyl carbamate and/or N-octyl carbamate, preferably N-(p-tolyl) carbamate.

Mono-carbamates can also be obtained from the corresponding mono-isocyanates by reaction with the corresponding alcohol. The reaction of the mono-carbamate with the alcohol can be performed in the same reactor as the polymerisation reaction or in a separate reactor.

Compounds comprising a mono-epoxide group within the scope of the invention are compounds comprising one epoxy group in the molecule, preferably compounds of the formula (IX):

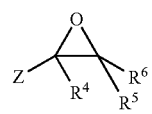

(IX)

wherein

Z, R4, R5 and R6 have the above meaning.

Suitable mono-epoxide compounds of the formula (IX) are compounds selected from the group consisting of phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide and/or N-glycidyl phthalimide, preferably 4-tert-butylphenyl glycidyl ether.

Compounds comprising a mono-isocyanate group within the scope of the invention are compounds containing one isocyanate group in the molecule, preferably compounds of the formula (X):

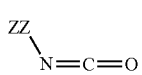

(X)

Wherein

ZZ has the above meaning.

Preferably ZZ represents a C1-C22 linear or branched alkyl group, optionally comprising heteroatoms and/or optionally substituted with a heteroatom containing group; C5-C22 cycloalkyl group, optionally comprising heteroatoms; C6-C18 aryl group, optionally comprising heteroatoms; and/or optionally substituted with a heteroatom containing group;

Preferred mono-isocyanate compounds of the above formula (X) are n-hexylisocyanate, cyclohexyl isocyanate, w-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexylisocyanatate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentylphenyl isocyanate, 4-t-butyl phenyl isocyanate or 1-naphthyl isocyanate, preferably p-tolyl isocyanate.

In an alternative embodiment a mixture of at least one compound comprising a mono-carbamate group and at least one compound comprising a mono-epoxide group is used.

As used herein, the term "base" is meant to denote a compound having an atom in the entire molecular framework, which is able to abstract an acidic proton from another organic compound, preferably this atom is a heteroatom such as N, O, P, S. Furthermore the base has a base strength $pK_b$ of $\leq 9$, preferably $\leq 7$, more preferred $\leq 5.3$. In the case of polybasic compounds, the base strength of the first association step is used. The base strength can be determined from the dissociation constant $pK_a$ of the corresponding acid in aqueous solution at 25° C. and is obtained as $pK_b=14-pK_a$. To place the $pK_b$ value into perspective, $NH_3$ has a $pK_b$ value of 4.79 and the $OH^-$ ion has a $pK_b$ value of −1.74.

Suitable bases are compounds, wherein the atom which is able to abstract an acidic proton from another organic compound is part of conjugated system and/or an aromatic ring. Examples for such bases are 1,8-diazabicyclo[5.4.0]undec-7-ene (DBU), 1,4-diazabicyclo[2.2.2]octane (DABCO), 1,5-diazabicyclo[4.3.0]non-5-ene (DBN), triazabicyclodecene (TBD). 6-(dibutylamino)-1,8-diazabicyclo[5.4.0]undec-7-ene and imidazoles such as 1,2-dimethylimidazole, 1-benzyl-2-phenylimidazole, 1-benzyl-2-methylimidazole, 2-undecylimidazole, 2-heptadecylimidazole, 2-ethyl-4-methylimidazole, 1-cyanoethyl-2-ethyl-4-methylimidazole, 1-cyanoethyl-2-methylimidazole and 2-phenylimidazole.

Another class of suitable bases are sterically hindered bases. As used herein, the term "sterically hindered base" is meant to denote a base compound, whereby the atom which is able to abstract an acidic proton from another organic compound is surrounded by sterically demanding groups. Examples for sterically hindered bases are as diisopropylamine, N,N-diisopropylethylamine (DIPEA), 2,2,6,6-tetramethylpiperidine (TMP) and tetrakis[tris(dimethylamino)-phosphoranylidenamino]-phosphonium chloride.

Preferred bases with a base strength $pK_b$, of $\leq 5.3$ in the process according to the invention are compounds selected from the group consisting of 1,8-diazabicyclo[5.4.0]undec-7-ene (DBU), 1,4-diazabicyclo[2.2.2]octane (DABCO), 1,5-diazabicyclo[4.3.0]non-5-ene (DBN), triazabicyclodecene (TBD) and tetrakis[tris(dimethylamino)-phosphoranylidenamino]-phosphonium chloride.

In one embodiment of the method according to the invention, the base catalyst is present in an amount of $\geq 0.001$ to $\leq 5.0$ weight-%, preferably in an amount of $\geq 0.01$ to $\leq 1.0$ weight-%, more preferred $\geq 0.05$ to $\leq 0.5$ weight-%, based on the theoretical yield of polyoxazolidinone.

The molecular weight of the obtained polyoxazolidinone is determined by the molar ratio of the bisepoxide compound relative to biscarbamate compound and optionally relative to chain regulator.

The molar ratio of bisepoxide compound to biscarbamate compound is preferably in the range from 1:2 to 2:1, more preferably in the range from 45:55 to 2:1 and even more preferably in the range 49.5:50.5 to 50.5:49.5. When the bisepoxide compound is employed in excess, preferably a mono-carbamate is employed as chain regulator. When the biscarbamate compound is employed in excess, preferably a mono-epoxide is employed as chain regulator.

Preferably, the molar amount of mono-epoxide and mono-carbamate compound added as chain regulator fulfils certain criteria with respect to the molar amount of bisepoxide and biscarbamate. The ratio r is defined as the absolute value of the molar amount of chain regulator ($n_{regulator}$) divided by the difference between the molar amount of bisepoxide ($n_{bisepoxide}$) and the molar amount of biscarbamate ($n_{biscarbamate}$) according to the following formula (XI)

$$r=|n_{regulator}/(n_{bisepoxide}-n_{biscarbamate})| \qquad (XI)$$

and is preferably in the range of $\geq 1.5$ to $\leq 2.5$, more preferably in the range of $\geq 1.9$ to $\leq 2.1$, and particularly preferred in the range of $\geq 1.95$ to $\leq 2.05$. Without being bound to a theory, all epoxide groups and all carbamate groups will have reacted at the end of the reaction, when such an amount of chain regulator is being used.

The chain regulator, preferably a compound comprising a mono-epoxide group and/or a compound comprising a mono-carbamate group, may be added to the reaction mixture at the beginning of the polymerisation reaction. The chain regulator may also be added during the reaction or after the reaction of bisepoxide and biscarbamate has been completed. In an alternative embodiment the mono-epoxide and/or mono-carbamate compound may be added in portions at different times of the reaction. Preferably the mono-epoxide and/or mono-carbamate compound is added at the beginning or during the polymerisation reaction of the bisepoxide and the biscarbamate.

As an alternative, an excess of a mono-epoxide and/or a mono-carbamate compound is added as chain regulator to the reaction mixture after the reaction between bisepoxide and biscarbamate has been completed. Without being bound to a theory, the terminal epoxide groups or the terminal carbamate groups resulting from the reaction of the bisepoxide and the biscarbamate will be converted to inert end groups by reaction with the regulator. The excess amount of regulator is subsequently removed from the product, e.g., by extraction, precipitation, distillation, stripping or thin film evaporation.

For the process according to the invention it has further been shown that the reaction is advantageously carried out at a temperature of ≥100 to ≤300° C., preferably of ≥120 to ≤270° C., more preferably of ≥140 to ≤250° C. If temperatures below 100° C. are set, the reaction is generally very slow. At temperatures above 300° C., the amount of undesirable secondary products increases considerably.

In a preferred embodiment of the invention the reaction is carried out under a reduced pressure (absolute) of ≥10 mbar to ≤1000 mbar, preferably ≥20 mbar to ≤800 mbar, most preferably from ≥50 mbar to ≤500 mbar. In an alternative embodiment, the reaction mixture is stripped by passing a stream of inert gas, such as nitrogen, argon through the reaction mixture. Without being bound to a theory, carrying out the reaction under a reduced pressure or stripping the reaction mixture with an inert gas removes the alcohol released during condensation reaction from the reaction mixture, which leads to reduced side reactions such as the homopolymerisation of epoxide groups which leads to cross linking of the polymer chains.

The reaction may be performed in the presence of solvent or in absence of a solvent. Preferred is the reaction in the presence of a polar solvent and most preferably in the presence of an aprotic polar solvent.

Suitable solvents are for example polar organic solvents such as linear or branched alkanes or mixtures of alkanes, toluene, xylene and the isomeric xylene mixtures, mesitylene, mono or polysubstituted halogenated aromatic solvents or halogenated alkane solvents, for example chlorobenzene, dichlorobenzene, dichloromethane, dichloroethane, tetrachloroethane, linear or cyclic ether such as tetrahydrofurane (THF) or methyl-tert-butylether (MTBE), linear or cyclic ester, or polar aprotic solvents such as 1,4-dioxane, acetonitrile, N,N-dimethylformamide (DMF), N,N-dimethylacetamide (DMAc), dimethylsulfoxid (DMSO), cyclic carbonate, such as ethylencarbonate or propylencarbonate, N-methylpyrrolidone (NMP), sulfolane, tetramethylurea, N,N'-dimethylethylenurea or mixtures of the above mentioned solvents and/or with other solvents. Preferred solvents are N,N-dimethylacetamide (DMAc) and N-methylpyrrolidone (NMP). Most preferably the reaction is carried out in the absence of a solvent.

The reaction of the bisepoxide with the biscarbamate may be carried out in a continuous process, in a batch process or in a semi-batch process.

In one embodiment of the method according to the invention, the process is carried out continuously. That means in this continuous process the bisepoxide, biscarbamate, regulator, base as catalyst and, if applicable, a solvent are continuously added whereas a part of the reaction mixture is continuously removed from the reactor. A residence-time reactor may be added after the continuously reactor in order to complete the reaction.

In an alternative embodiment of the method according to the invention, the process is carried out as a batch process. In this batch process the bisepoxide, the biscarbamate, the regulator, the catalyst and, if applicable, a solvent are charged in a reactor and the reaction runs until full conversion is obtained. In an alternative procedure, the regulator can be added during the reaction or after the reaction between bisepoxide and biscarbamate has been completed.

In an alternative embodiment of the method according to the invention, a semi-batch process is preferred. The bisepoxide is preferably mixed with a catalyst and optionally a solvent and/or a regulator in a reactor and the biscarbamate and possibly regulator are continuously added to the reaction as pure material or in solution. The added amount of biscarbamate is calculated so that the desired molecular weight is achieved. In an alternative embodiment, the biscarbamate is charged in the reactor along with the catalyst and optionally a regulator and/or solvents while the bisepoxide and possibly regulator are continuously added to the reaction mixture as a pure substance or in solution.

In an alternative embodiment the biscarbamate compound is added to the bisepoxide compound in a continuous or step-wise manner with two or more individual addition steps in the step-wise addition. This is to be understood in such a way that during the course of the reaction the biscarbamate compound is added continuously or in the aforementioned step-wise manner. Included is also the case that the biscarbamate compound is added via a pump, dripping funnel or other continuous or semi-continuous devices where the biscarbamate is brought into the reaction mixture in slow manner. Although some after-reaction time may be given to the reaction system, the reaction should be essentially complete shortly after the end of the addition of the biscarbamate compound.

The reaction time for the polymerisation is for example 0.05 to 120 hours, preferably 0.5 to 48 hours, more preferred 1 to 24 hours. The reaction time is the time wherein the bisepoxide, the biscarbamate, the chain regulator, the base catalyst and if applicable a solvent are in direct contact at the reaction temperature.

Preferably, the precise content of epoxide and carbamate groups in the bisepoxide, biscarbamate, monoepoxide and bisepoxide compound are determined before the polymerisation reaction. This can be achieved, e.g., by measuring the epoxide number according to German standard norm DIN EN 1877-1 and by confirming the purity of the carbamate compounds by $^1$H NMR.

The molecular weight of the polyoxazolidinone is preferentially ≥1,000 to ≤1,000,000 g/mol, more preferred ≥2,000 to ≤100,000 g/mol and even more preferred ≥10,000 to ≤50,000 g/mol. The molecular weight of the polyoxazolidinone may be calculated, e.g., by end-group analysis based on $^1$H-NMR spectroscopy. The number average molecular weights $M_n$ is preferentially ≥500 to ≤500,000 g/mol, more preferred ≥1,000 to ≤50,000 g/mol and even more preferred ≥5,000 to ≤25,0000 g/mol. One method for determining the number average molecular weights of the polyoxazolidinone is by using gel permeation chromatography (GPC) which is described below in the methods.

Polyoxazolidinones obtained by the method according to the invention are thermally mouldable at elevated temperatures and are suitable for any field where thermoplastic materials are employed. Polyoxazolidinones are particularly suitable for applications, where transparent, light-coloured and/or high temperature-stable materials are required. Thermoplastic polyoxazolidinones can, thus, be employed, e.g., in skylights, roofing, curtain walls, office dividers, swimming pool enclosures, greenhouses, displays and signage.

EXAMPLES

Epoxides:

| | |
|---|---|
| BADGE | 2-[[4-[2-[4-(Oxiran-2-ylmethoxy)phenyl]propan-2-yl]phenoxy]methyl]oxirane (Bisphenol-A-diglycidylether), difunctional epoxide |
| RDE | Resorcinol diglycidylether, difunctional epoxide |
| BPGE | tert-Butylphenylglycidylether, monofunctional epoxide |

Carbamates:

| | |
|---|---|
| TDC | O,O'-Dimethyl-toluene-2,4-dicarbamate, difunctional carbamate, prepared by reaction of toluene-2,4-diisocyanate with methanol |
| MDC | O,O'-Dimethyl-4,4'-methylendiphenyl-1,1'-dicarbamate, difunctional carbamate, prepared by reaction of 4,4'-methylendiphenyl-1,1'-diisocyanate with methanol |
| PTC | O-Methyl-4-tolyl-carbamate, monofunctional carbamate, prepared by reaction of 4-tolylisocyanate with methanol |

Synthesis of Polyoxazolidinone

The 10 ml Schlenk tube used in the examples was a glass tube with an internal height of 10.5 cm and an internal diameter of 1.6 cm. Close to the top, the Schlenk tube was fitted with three side arms. The lower part of the Schlenk tube was inserted into an electric heating jacket (510 Watt maximum heating power). A cylindrical magnetic stirring bar (PTFE, 10 mm long and 6 mm in diameter) was placed inside of the Schlenk tube. One opening of the Schlenk tube was connected to a water-cooled condenser. The alcohol evolved during the reaction was collected in a receiver flask cooled with ice. One opening of the Schlenk tube was closed with a plug. Two arms of the Schlenk tube were closed with rubber septa. A temperature probe (1 mm diameter and 15 cm length) was inserted through one of the septa in such a way that the tip became immersed in the reaction mixture once the Schlenk tube was charged with reagents. A gentle Argon-flow was established by passing Argon through a long needle, which was inserted through the second septum, into the lower part of the Schlenk tube. The Argon was released through a second needle. The oxazolidinone product was obtained as detailed below and analysed with IR and NMR spectroscopy, HPLC chromatography as well as for its colour. The amount of base is stated in weight-% relative to the theoretical yield of polyoxazolidinone.

Characterisation of Polyoxazolidinone

Solid state IR analyses were performed on a Bruker ALPHA-P IR spectrometer equipped with a diamond probe head. The software OPUS 6.5 was used for data treatment. A background spectrum was recorded against ambient air. Thereafter, a small sample of the polyoxazolidinone (2 milligrams) was applied to the diamond probe and the IR spectrum recorded averaging over 32 spectra obtained in the range of 4000 to 400 cm$^{-1}$ with a resolution of 4 cm$^{-1}$.

In the condensation reaction, 3,5-oxazolidin-2-one (5-oxazolidinone) regioisomer according to the following formula is preferentially formed:

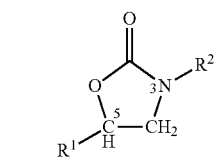

The 3,4-oxazolidin-2-one (4-oxazolidinone) according to the following formula can also be obtained.

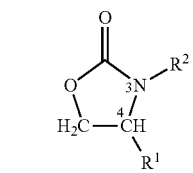

The average chain length of the polyoxazolidinones was controlled by the molar ratio of bisepoxide, biscarbamate and/or chain regulator.

The formula below gives a general mathematical formula to calculate the average chain length n in the oligomeric product obtained with a monocarbamate or monoisocyanate as chain regulator:

$$n=1/[\{(n_{bisepoxide})/(n_{biscarbamate})\}-1]$$

whereby $n_{bisepoxide}$ is the molar amount of bisepoxide and $n_{biscarbamate}$ is the molar amount of biscarbamate.

The formula below gives a general mathematical formula to calculate the average chain length n in the oligomeric product obtained with a monoepoxide as chain regulator:

$$n=1/[\{(n_{biscarbamate})/(n_{bisepoxide})\}-1]$$

whereby $n_{biscarbamate}$ is the molar amount of biscarbamate and $n_{bisepoxide}$ is the molar amount of bisepoxide.

The ratio r defined as the absolute value of the molar amount of chain regulator ($n_{regulator}$) to the difference between the molar amount of bisepoxide ($n_{bisepoxide}$) and the molar amount of biscarbamate ($n_{biscarbamate}$) according to formula (VIII) was 2. The weight average molecular weight ($M_w$) and the number of repeating units in the synthesized polyoxazolidinone were calculated by end-group analysis based on $^1$H-NMR spectroscopy.

For $^1$H NMR analysis, a sample of the oligomer was dissolved in deuterated dimethyl sulfoxide and measured on a Bruker spectrometer (AV400, 400 MHz).

Gel permeation chromatography (GPC) measurements were performed at 40° C. in N,N-dimethylacetamide (DMAc, flow rate of 0.6 mL min$^{-1}$). The column set consisted of 4 consecutive columns (GRAM 3000, HEMA300, HEMA 40, HEMA 40). Samples (concentration 10-15 g L$^{-1}$, injection volume 100 μL) were injected employing an HP1200 auto sampler. A UV-detector was used for following the concentration at the exit of the column. Raw data were processed using the PSS WinGPC Unity software package. Polystyrene of known molecular weight was used as reference to calculate the molecular weight distribution. The weight average molecular weight measured by GPC is denominated as $M_w$ and the number average molecular weight as $M_n$ in the examples.

The stability of the polyoxazolidinones was characterised by thermogravimetric analysis (TGA). The measurements were performed on a Mettler Toledo TGA/DSC 1. The sample (6 to 20 mg) was heated from 25° C. to 600° C. with a heating rate of 10 K/min and the relative weight loss followed in dependence of temperature. For data analysis the software STAR$^e$ SW 11.00 was used. As decomposition temperature ($T_d$) the onset point of the sinuidal weight loss curve is stated.

The glass transition point was recorded on a Mettler Toledo DSC 1. The sample (4 to 10 mg) was heated from 25° C. to 250° C. with a heating rate of 10 K/min. For data analysis the software STAR$^e$ SW 11.00 was used. For determination of the glass transition temperature a tangential analysis method was used. The midpoint of the intersection point between the tangent at low temperature and the tangent in the mid temperature range and the intersection point between the tangent in the mid temperature range and the tangent at high temperature is stated.

To determine the thermal stability of the polyoxazolidinones the sample (4 to 10 mg) was submitted to 4 heating-cooling cycles as described below:

|  | Temperature [° C.] | Rate |
|---|---|---|
| Heating 1 | 30-250 | 10 K/min |
| Cooling 1 | 250-30 | 10 K/min |
| Heating 2 | 30-250 | 10 K/min |
| Cooling 2 | 250-30 | 10 K/min |
| Heating 3 | 30-280 | 10 K/min |
| Tempering | 280 | for 30 min |
| Cooling 3 | 280-30 | 10 K/min |
| Heating 4 | 30-250 | 10 K/min |
| Cooling 4 | 250-30 | 10 K/min |

The glass transition temperature was determined as described above using the cooling diagram 2 (before tempering) and cooling diagram 3 (after tempering). The two glass transition temperatures are compared: a $\Delta T_g$ smaller or equal to 7° C. describes a thermally stable compound.

Example 1: Oligomerization of O,O'-Dimethyl-4,4'-methylendiphenyl-1,1'-dicarbamate (MDC) and 4,4'-isopropylidenediphenol Diglycidyl Ether (BADGE) with 4-tert-butylphenyl Glycidyl Ether (BPGE) as Chain Regulator Using 1,8-diazabicyclo[5.4.0]undec-7-ene (DBU) as Catalyst A 50 mL Schlenk tube was charged with MDC (6.33 g, 20.14 mmol) and BADGE (3.45 g, 10.13 mmol), closed and inertised with argon. Then, the Schlenk tube was charged with NMP (30 ml). The mixture was stirred (400 rpm) and heated to 180° C. DBU (16.5 mg, 1 mol % relative to biscarbamate, 0.35 weight-% relative to polyoxazolidinone) was added. Argon was bubbled through the reaction mixture by immersing the long metal needle into the reaction mixture. After 120 min, half of the reaction mixture was removed. To the reaction mixture left, 4-tert-butylphenyl glycidyl ether (5.2, 23.30 mmol) was added. After another 60 min, the reaction mixture was allowed to cool to room temperature.

Analysis of the reaction mixture by $^1$H NMR spectroscopy showed complete conversion of the carbamate groups.

The polyoxazolidinone was precipitated with methanol, collected by filtration, washed with methanol, dried under vacuum and analysed.

In the solid state IR spectrum the characteristic signal for the oxazolidinone carbonyl group was observed at 1746 cm$^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 5.0 ppm and 4.1 ppm.

Integration of the NMR signals showed that the chemoselectivity to oxazolidinone was >98.0%.

The content of the 5-oxazolidinone regioisomer was >99.9%.

From $^1$H NMR analysis, the number average molecular weight $M_n$ was calculated to 1960 g·mol$^{-1}$ and the average chain length n was 2.2.

The polyoxazolidinone compound was thermally stable until 389° C.

The glass transition temperature was 127° C.

The $\Delta T_g$ value was 6° C.

Example 2 (Comparison): Oligomerization of O,O'-dimethyl-4,4'-methylendiphenyl-1,1'-dicarbamate (MDC) and 4,4'-isopropylidenediphenol Diglycidyl Ether (BADGE) in the Absence of a Chain Regulator to a Carbamate Terminated Polyoxazolidinone Using 1,8-diazabicyclo[5.4.0]undec-7-ene (DBU) as Catalyst A 50 mL Schlenk tube was charged with MDC (6.33 g, 20.14 mmol) and BADGE (3.45 g, 10.13 mmol), closed and inertised with argon. Then, the Schlenk tube was charged with NMP (30 ml). The mixture was stirred (400 rpm) and heated to 180° C. DBU (16.5 mg, 1 mol % relative to biscarbamate, 0.35 weight-% relative to polyoxazolidinone) was added. Argon was bubbled through the reaction mixture by immersing the long metal needle into the reaction mixture. After 120 min, half of the reaction mixture was removed. After 120 min, half of the reaction mixture was removed and allowed to cool to room temperature.

Analysis of the reaction mixture by $^1$H NMR spectroscopy showed complete conversion of the epoxide groups.

The polyoxazolidinone was precipitated with methanol, collected by filtration, washed with methanol, dried under vacuum and analysed.

In the solid state IR spectrum the characteristic signal for the oxazolidinone carbonyl group was observed at 1746 cm$^{-1}$.

In the solid state IR spectrum the characteristic signal for isocyanurate groups was not observed.

In the $^1$H NMR spectrum, the characteristic signals for epoxide groups were not observed.

In the $^1$H NMR spectrum, the characteristic methine and methylene signals assigned to the oxazolidinone moieties were observed at 5.0 ppm and 4.1 ppm.

Integration of the NMR signals showed that the chemoselectivity to oxazolidinone was >98.0%.

The content of the 5-oxazolidinone regioisomer was >99.9%.

From $^1$H NMR analysis, the number average molecular weight $M_n$ was calculated to 1140 g·mol$^{-1}$ and the average chain length n was 1.4.

The polyoxazolidinone compound was thermally stable until 372° C.
The glass transition temperature was 189° C.
The $\Delta T_g$ value was 41° C.

Example 3: Oligomerization of O,O'-dimethyl-4,4'-methylendiphenyl-1,1'-dicarbamate (NIDC) and 4,4'-isopropylidenediphenol Diglycidyl Ether (BADGE) in the Presence of O-methyl-4-methyl-phenyl Carbamate (MPC) as Chain Regulator Using 1,8-diazabicyclo[5.4.0]undec-7-ene (DBU) as Catalyst A 50 mL Schlenk tube was charged with MDC (3.16 g, 10.05 mmol) and BADGE (6.85 g, 20.12 mmol), closed and inertised with argon. Then, the Schlenk tube was charged with NMP (30 ml). The mixture was stirred (400 rpm) and heated to 180° C. DBU (16.5 mg, 1 mol % relative to biscarbamate, 0.35 weight-% relative to polyoxazolidinone) was added. Argon was bubbled through the reaction mixture by immersing the long metal needle into the reaction mixture. After 120 min, half of the reaction mixture was removed. To the reaction mixture left, O-methyl-4-methyl-phenyl carbamate (2.00 g, 12.13 mmol) was added. After another 60 min, the reaction mixture was allowed to cool to room temperature.

Analysis of the reaction mixture by $^1$H NMR spectroscopy showed complete conversion of the carbamate groups.

The polyoxazolidinone was precipitated with methanol, collected by filtration, washed with methanol, dried under vacuum and analysed.

In the solid state IR spectrum the characteristic signal for the oxazolidinone carbonyl group was observed at 1747 $cm^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 5.0 ppm and 4.1 ppm.

Integration of the NMR signals showed that the chemoselectivity to oxazolidinone was >98.0%.

The content of the 5-oxazolidinone regioisomer was >99.9%.

From $^1$H NMR analysis, the number average molecular weight $M_n$ was calculated to 1845 g·$mol^{-1}$ and the average chain length n was 2.1.

The polyoxazolidinone compound was thermally stable until 381° C.
The glass transition temperature was 112° C.
The $\Delta T_g$ value was 0° C.

Example 4 (Comparison): Oligomerization of O,O'-dimethyl-4,4'-methylendiphenyl-1,1'-dicarbamate (MDC) and 4,4'-isopropylidenediphenol Diglycidyl Ether (BADGE) in the Absence of a Chain Regulator to an Epoxide Terminated Polyoxazolidinone Using 1,8-diazabicyclo[5.4.0]undec-7-ene (DBU) as Catalyst A 50 mL Schlenk tube was charged with MDC (3.16 g, 10.05 mmol) and BADGE (6.85 g, 20.12 mmol), closed and inertised with argon. Then, the Schlenk tube was charged with NMP (30 ml). The mixture was stirred (400 rpm) and heated to 180° C. DBU (16.5 mg, 1 mol % relative to biscarbamate, 0.35 weight-% relative to polyoxazolidinone) was added. Argon was bubbled through the reaction mixture by immersing the long metal needle into the reaction mixture. After 120 min, half of the reaction mixture was removed and allowed to cool to room temperature.

Analysis of the reaction mixture by $^1$H NMR spectroscopy showed complete conversion of the carbamate groups.

The polyoxazolidinone was precipitated with methanol, collected by filtration, washed with methanol, dried under vacuum and analysed.

In the solid state IR spectrum the characteristic signal for the oxazolidinone carbonyl group was observed at 1747 $cm^{-1}$.

In the solid state IR spectrum the characteristic signal for isocyanurate groups was not observed.

In the $^1$H NMR spectrum, the characteristic signals for carbamate were not observed and epoxide groups were observed.

In the $^1$H NMR spectrum, the characteristic methine and methylene signals assigned to the oxazolidinone moieties were observed at 5.0 ppm and 4.1 ppm.

Integration of the NMR signals showed that the chemoselectivity to oxazolidinone was >98.0%.

The content of the 5-oxazolidinone regioisomer was >99.9%.

From $^1$H NMR analysis, the number average molecular weight $M_n$ was calculated to 1461 g·$mol^{-1}$ and the average chain length n was 1.9.

The polyoxazolidinone compound was thermally stable until 392° C.
The glass transition temperature was 128° C.
The $\Delta T_g$ value was 26° C.
Comparison

TABLE 1

Comparison of the results of Examples 1, 2, 3 and 4

| Example | Regulator | Terminal group | $\Delta T_g$ |
|---|---|---|---|
| 1 | BPGE | 4-tert-Butylphenyl | 6 |
| 2 (Comp.) | none | O-Methyl-carbamate | 41 |
| 3 | MPC | p-Tolyl | 0 |
| 4 (Comp.) | none | Glycidyl ether | 26 |

Comp.: comparison example

A comparison of examples 1 with comparison example 2 and a comparison of examples 3 with comparison example 4 shows that the polyoxazolidinone products obtained with the use of a chain regulator according to this invention (examples 1 and 3) have a higher thermal stability compared to a polyoxazolidinone product obtained without the use of a chain regulator (comparison examples 2 and 4).

Example 5: Polymerization of O,O-dimethyl-4,4-methylendiphenyl-1,1-dicarbamate (MDC) and 4,4'-isopropylidenediphenol Diglycidyl Ether (BADGE) in the Presence of 4-tert-butylphenyl Glycidyl Ether (BPGE) as Chain Regulator Using 1,8-diazabicyclo[5.4.0]undec-7-ene (DBU) as Catalyst A 25 mL Schlenk tube was charged with MDC (1.99 g, 6.4 mmol) and BADGE (1.97 g, 5.8 mmol), closed and inertised with argon. Then, the Schlenk tube was charged with NMP (16 ml). The mixture was stirred (400 rpm) and heated to 180° C. DBU (12.8 mg, 1 mol % relative to biscarbamate, 0.35 weight-% relative to polyoxazolidinone) was added.

Argon was bubbled through the reaction mixture by immersing the long metal needle into the reaction mixture. After 195 min, 4-tert-butylphenyl glycidyl ether (0.5 ml, 2.3 mmol) was added. After another 60 min, the reaction mixture was allowed to cool to room temperature.

Analysis of the reaction mixture by $^1$H NMR spectroscopy showed complete conversion of the carbamate groups.

The polyoxazolidinone was precipitated with methanol, collected by filtration, washed with diethylether, dried under vacuum and analysed.

In the solid state IR spectrum the characteristic signal for the oxazolidinone carbonyl group was observed at 1747 $cm^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 4.9 ppm and 4.1 ppm.

Integration of the NMR signals showed that the chemoselectivity to oxazolidinone was >98.0%.

The content of the 5-oxazolidinone regioisomer was >99.9%.

Based on GPC analysis, the weight average molecular weight Mw was 28446 g/mol with a polydispersity of 3.7.

The polyoxazolidinone compound was thermally stable until 375° C.

The glass transition temperature was 160.0° C.

Example 6: Polymerization of O,O'-dimethyl-toluene-2, 4-dicarbamate (TDC) and 4,4'-isopropylidenediphenol Diglycidyl Ether (BADGE) in the Presence of 4-tert-butylphenyl Glycidyl Ether (BPGE) as Chain Regulator A 25 mL Schlenk tube was charged with TDC (1.99 g, 8.4 mmol), closed and inertised with argon. Then, the Schlenk tube was charged with NMP (8 ml) and DBU (12.8 mg, 1 mol % relative to biscarbamate, 0.33 weight-% relative to polyoxazolidinone). The mixture was stirred (400 rpm) and heated to 180° C. A solution of BADGE (2.60 g, 7.63 mmol) in NMP (10 ml) was added with a dropping funnel over 10 min. Argon was bubbled through the reaction mixture by immersing the long metal needle into the reaction mixture. After 255 min, 4-tert-butylphenyl glycidyl ether (0.5 ml, 2.3 mmol) was added. After another 2 h, the reaction mixture was allowed to cool to room temperature.

Analysis of the reaction mixture by $^1$H NMR spectroscopy showed complete conversion of the carbamate groups.

The polyoxazolidinone was precipitated with diethylether, collected by filtration, dried under vacuum and analysed.

In the solid state IR spectrum the characteristic signal for the oxazolidinone carbonyl group was observed at 1747 $cm^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 4.9 ppm and 4.1 ppm.

Integration of the NMR signals showed that the chemoselectivity to oxazolidinone was >98.0%.

The content of the 5-oxazolidinone regioisomer was >99.9%.

Based on GPC analysis, the weight average molecular weight $M_w$ was 92814 g/mol with a polydispersity of 6.6.

The polyoxazolidinone compound was thermally stable until 381° C.

The glass transition temperature was 173.5° C.

Example 7: Polymerization of O,O'-dimethyl-4, 4-methylendiphenyl-1,1-dicarbamate (MDC) and 4,4'-isopropylidenediphenol Diglycidyl Ether (BADGE) in the Presence of 4-tert-butylphenyl Glycidyl Ether as Chain Regulator Using 1,4-diazabicyclo[2.2.2]octane (DABCO) as Catalyst A 25 mL Schlenk tube was charged with MDC (2.00 g, 6.36 mmol) and BADGE (1.98 g, 5.81 mmol), closed and inertised with argon. Then, the Schlenk tube was charged with NMP (16 ml). The mixture was stirred (400 rpm) and heated to 180° C. DBU (12.8 mg, 1 mol % relative to biscarbamate, 0.32 weight-% relative to polyoxazolidinone) was added. Argon was bubbled through the reaction mixture by immersing the long metal needle into the reaction mixture. After 300 min, 4-tert-butylphenyl glycidyl ether (0.5 ml, 2.3 mmol) was added. After another 90 min, the reaction mixture was allowed to cool to room temperature.

The polyoxazolidinone was precipitated with methanol, collected by filtration, washed with diethylether, dried under vacuum and analysed.

In the solid state IR spectrum the characteristic signal for the oxazolidinone carbonyl group was observed at 1747 $cm^{-1}$.

In the solid state IR spectrum the characteristic signal for isocyanurate groups was not observed.

In the $^1$H NMR spectrum, the characteristic signals epoxide groups were not observed.

In the $^1$H NMR spectrum, the characteristic methine and methylene signals assigned to the oxazolidinone moieties were observed at 4.9 ppm and 4.1 ppm.

Integration of the NMR signals showed that the chemoselectivity to oxazolidinone was >98.0%.

The content of the 5-oxazolidinone regioisomer was >99.9%.

Based on GPC analysis, the weight average molecular weight $M_w$ was 21168 g/mol with a polydispersity of 3.7.

The polyoxazolidinone compound was thermally stable until 392° C.

The glass transition temperature was 153° C.

Example 8 (Comparison): Polymerization of O,O'-dimethyl-toluene-2, 4-dicarbamate O,O'-Dimethyl-4,4-methylendiphenyl-1, 1-dicarbamate (TDC) and 4,4'-isopropylidenediphenol Diglycidyl Ether (BADGE) in the Presence of Tetraphenylantimony Bromide (SbPh$_4$Br) as Catalyst A 25 mL Schlenk tube was charged with MDC (2.00 g, 6.36 mmol) and BADGE (1.97 g, 5.78 mmol), closed and inertised with argon. Then, the Schlenk tube was charged with NMP (16 ml). The mixture was stirred (400 rpm) and heated to 180° C. SbPh$_4$Br (32.5 mg, 1 mol % relative to biscarbamate, 0.64 weight-% relative to polyoxazolidinone) was added. Argon was bubbled through the reaction mixture by immersing the long metal needle into the reaction mixture. After 180 min, 4-tert-butylphenyl glycidyl ether (0.5 ml, 2.3 mmol) was added. After another 60 min, the reaction mixture was allowed to cool to room temperature.

Analysis of the reaction mixture by $^1$H NMR spectroscopy showed uncomplete conversion of the carbamate groups.

In the solid state IR spectrum the characteristic signals for isocyanurate and urea groups were observed.

Example 9 (Comparison): Polymerization of O,O'-dimethyl-toluene-2,4-dicarbamate (TDC) and 4,4'-isopropylidenediphenol Diglycidyl Ether (BADGE) in the Absence of a Base as Catalyst A 25 mL Schlenk tube was charged with TDC (1.99 g, 8.4 mmol) and BADGE (2.60 g, 7.63 mmol), closed and inertised with argon. Then, the Schlenk tube was charged with NMP (18 ml). The mixture was stirred (400 rpm) and heated to 180° C. Argon was bubbled through the reaction mixture by immersing the long metal needle into the reaction mixture. After 180 min, the reaction mixture was allowed to cool to room temperature.

Analysis of the reaction mixture by $^1$H NMR spectroscopy showed no conversion of the carbamate and epoxide groups.

In the solid state IR spectrum the characteristic signal for the oxazolidinone carbonyl group was not observed.

In the $^1$H NMR spectrum, the characteristic signals for carbamate and epoxide groups were observed.

In the $^1$H NMR spectrum, the characteristic methine and methylene signals assigned to the oxazolidinone moieties were not observed.
Comparison

TABLE 2

Comparison of the results of examples 5, 7, 8 and 9

| Example | Catalyst | Conversion of epoxide to polyoxazolidinone [%] | Conversion of carbamate to polyoxazolidinone [%] |
|---|---|---|---|
| 5 | DBU | >99.9 | >99.9 |
| 7 | DABCO | >99.9 | >99.9 |
| 8 (Comp.) | SbPh$_4$Br | <0.1 | <0.1 |
| 9 (Comp.) | none | <0.1 | <0.1 |

Comp.: comparison example

Examples 5 and 7 demonstrate that the polyoxazolidinone product according to the invention can be obtained by using different base catalysts.

A comparison of examples 5 and 7 with comparison examples 8 and 9 shows that the polyoxazolidinone product is obtained only in the presence of a base (examples 5 and 7), while no polyoxazolidinone product is obtained in the absence of a base (comparison examples 8 and 9).

Example 10: Polymerization of O,O'-dimethyl-4,4-methylendiphenyl-1,1-dicarbamate (MDC) and 4,4'-isopropylidenediphenol Diglycidyl Ether (BADGE) in the Presence of 4-tert-butylphenyl Glycidyl Ether (BPGE) as Chain Regulator Using 1,8-diazabicyclo[5.4.0]undec-7-ene (DBU) as Catalyst to a Polyoxazolidinone with 100 Repetition Units A 100 mL Schlenk tube was charged with MDC (11.25 g, 35.8 mmol) and BADGE (12.06 g, 35.4 mmol), closed and inertised with argon. Then, the Schlenk tube was charged with NMP (45 ml). The mixture was stirred (400 rpm) and heated to 180° C. DBU (54.4 mg, 1 mol % relative to biscarbamate, 0.23 weight-% relative to polyoxazolidinone) was added. Argon was bubbled through the reaction mixture by immersing the long metal needle into the reaction mixture. After 300 min, 4-tert-butylphenyl glycidyl ether (0.5 ml, 2.3 mmol) was added. After another 60 min, the reaction mixture was allowed to cool to room temperature.

Analysis of the reaction mixture by $^1$H NMR spectroscopy showed complete conversion of the carbamate groups.

The polyoxazolidinone was precipitated with methanol, collected by filtration, washed with diethylether, dried under vacuum and analysed.

In the solid state IR spectrum the characteristic signal for the oxazolidinone carbonyl group was observed at 1747 cm$^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 4.9 ppm and 4.1 ppm.

Integration of the NMR signals showed that the chemoselectivity to oxazolidinone was >98.0%.

The content of the 5-oxazolidinone regioisomer was >99.9%.

Based on GPC analysis, the weight average molecular weight $M_w$ was 65585 g/mol with a polydispersity of 6.7.

The polyoxazolidinone compound was thermally stable until 376° C.

The glass transition temperature was 165.6° C.

Example 11: Polymerization of O,O'-dimethyl-4,4-methylendiphenyl-1,1'-dicarbamate (MDC) and Resorcinol Diglycidyl Ether (RDE) in the Presence of 4-tert-butylphenyl Glycidyl Ether (BPGE) as Chain Regulator Using 1,8-diazabicyclo[5.4.0]undec-7-ene (DBU) as Catalyst A 100 mL Schlenk tube was charged with MDC (6.91 g, 22 mmol) and RDE (4.45 g, 20 mmol), closed and inertised with argon. Then, the Schlenk tube was charged with NMP (45 ml). The mixture was stirred (400 rpm) and heated to 180° C. DBU (33.5 mg, 1 mol % relative to biscarbamate, 0.31 weight-% relative to polyoxazolidinone) was added. Argon was bubbled through the reaction mixture by immersing the long metal needle into the reaction mixture. After 300 min, 4-tert-butylphenyl glycidyl ether (1 ml, 4.6 mmol) was added. After another 60 min, the reaction mixture was allowed to cool to room temperature.

Analysis of the reaction mixture by $^1$H NMR spectroscopy showed complete conversion of the carbamate groups.

The polyoxazolidinone was precipitated with methanol, collected by filtration, washed with methanol, dried under vacuum and analysed.

In the solid state IR spectrum the characteristic signal for the oxazolidinone carbonyl group was observed at 1747 cm$^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 4.9 ppm and 4.1 ppm.

Integration of the NMR signals showed that the chemoselectivity to oxazolidinone was >98.0%.

The content of the 5-oxazolidinone regioisomer was >99.9%.

Based on GPC analysis, the weight average molecular weight $M_w$ was 31665 g/mol with a polydispersity of 4.9.

The polyoxazolidinone compound was thermally stable until 352° C.

The glass transition temperature was 142.3° C.

Example 12: Polymerization of O,O'-dimethyl-4,4'-methylendiphenyl-1,1'-dicarbamate (MDC) and 4,4'-isopropylidenediphenol Diglycidyl Ether (BADGE) in the Presence of O-methyl-4-methyl-phenyl Carbamate (MPC) as Chain Regulator Using 1,8-diazabicyclo[5.4.0]undec-7-ene (DBU) as Catalyst A 100 mL Schlenk tube was charged with MDC (5.51 g, 17.5 mmol) and BADGE (6.03 g, 17.7 mmol), closed and inertised with argon. Then, the Schlenk tube was charged with NMP (45 ml). The mixture was stirred (400 rpm) and heated to 180° C. DBU (27.4 mg, 1 mol % relative to biscarbamate, 0.35 weight-% relative to polyoxazolidinone) was added. Argon was bubbled through the reaction mixture by immersing the long metal needle into the reaction mixture. After 300 min, 4-tert-butylphenyl glycidyl ether (100 mg, 0.7 mmol) was added. After another 60 min, the reaction mixture was allowed to cool to room temperature.

Analysis of the reaction mixture by $^1$H NMR spectroscopy showed complete conversion of the carbamate groups.

The polyoxazolidinone was precipitated with methanol, collected by filtration, washed with diethylether, dried under vacuum and analysed.

In the solid state IR spectrum the characteristic signal for the oxazolidinone carbonyl group was observed at 1747 cm$^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 4.9 ppm and 4.1 ppm.

Integration of the NMR signals showed that the chemoselectivity to oxazolidinone was >98.0%.

The content of the 5-oxazolidinone regioisomer was >99.9%.

Based on GPC analysis, the weight average molecular weight $M_w$ was 33029 g/mol with a polydispersity of 4.1.

The polyoxazolidinone compound was thermally stable until 370° C.

The glass transition temperature was 163.0° C.

Comparison

Examples 5 and 10 show that polyoxazolidinones varying in molecular weight can be obtained. Examples 5, 6 and 11 demonstrate that different combinations of biscarbamates and bisepoxides can be used to obtain polyoxazolidinone products according to this invention. Examples 5 and 12 demonstrate that a monoepoxide (Example 5) and a monocarbamate (Example 12) can be used as chain regulator to obtain polyoxazolidinone products according to this invention.

Example 13: Polymerization of O,O'-dimethyl-4,4-methylendiphenyl-1,1-dicarbamate (MDC) and 4,4'-isopropylidenediphenol Diglycidyl Ether (BADGE) in the Presence of 4-tert-butylphenyl Glycidyl Ether (BPGE) as Chain Regulator Using 1,8-diazabicyclo[5.4.0]undec-7-ene (DBU) as Catalyst and Dimethylacetamide (DMAc) as Solvent A 25 mL Schlenk tube was charged with MDC (1.99 g, 6.4 mmol) and BADGE (1.97 g, 5.8 mmol), closed and inertised with argon. Then, the Schlenk tube was charged with NMP (16 ml). The mixture was stirred (400 rpm) and heated to 180° C. DBU (12.8 mg, 1 mol % relative to biscarbamate, 0.35 weight-% relative to polyoxazolidinone) was added. Argon was bubbled through the reaction mixture by immersing the long metal needle into the reaction mixture. After 480 min, 4-tert-butylphenyl glycidyl ether (0.5 ml, 2.3 mmol) was added. After another 60 min, the reaction mixture was allowed to cool to room temperature.

Analysis of the reaction mixture by $^1$H NMR spectroscopy showed no complete conversion of the carbamate groups.

The polyoxazolidinone was precipitated with methanol, collected by filtration, washed with diethylether, dried under vacuum and analysed.

In the solid state IR spectrum the characteristic signal for the oxazolidinone carbonyl group was observed at 1747 cm$^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 4.9 ppm and 4.1 ppm.

Integration of the NMR signals showed that the chemoselectivity to oxazolidinone was >98.0%.

The content of the 5-oxazolidinone regioisomer was >99.9%.

From $^1$H NMR analysis, the number average molecular weight $M_n$ was calculated to 13586 g/mol and the average chain length n was 22.

Based on GPC analysis, the weight average molecular weight $M_w$ was 9336 g/mol with a polydispersity of 2.5.

The polyoxazolidinone compound was thermally stable until 371° C.

The glass transition temperature was 166° C.

Comparison

TABLE 4

Comparison of the results of Examples 5 and 13

| Example | Solvent | $M_w$ [g/mol] | $T_g$ [° C.] | $T_d$ [° C.] |
|---|---|---|---|---|
| 5 | NMP | 28446 | 160 | 375 |
| 13 | DMAc | 9336 | 166 | 371 |

Examples 5 and 13 show that also different solvents can be used to obtain polyoxazolidinone products according to this invention.

Example 14: Polymerization of 2,4-toluenediisocyanate (TDI) and 4,4'-isopropylidenediphenol Diglycidyl Ether (BADGE) in the Presence of 4-tolylisocyanate as Chain Regulator Using Tetraphenylphosphonium Bromide (PPh₄Br) as Catalyst and N-methylpyrrolidinone (NMP) as Solvent The reaction was performed in a 300 ml stainless steel autoclave from the company PARR instruments, equipped with a 4-blade stirrer and a stirring power of 90 W. The reactor was charged with bisepoxide 1 (15.0 g, 44.1 mmol) and catalyst PPh₄Br (194 mg, 0.46 mmol) and subsequently flushed with Argon. After addition of 40 ml of dry NMP, the reactor was sealed and the mixture was heated to 200° C. under rapid stirring (1000 rpm). After reaching 200° C., a solution of 2,4-tolyldiisocyanate (7.52 g, 42.85 mmol) in 15 ml dry NMP was added with an HPLC pump (10 ml pump head) over 3 h. After complete addition of the diisocyanate solution, 5 ml of dry NMP were added. The reaction was run for 16 h, then 800 mg (6 mmol) of tolylisocyanate n 5 ml of NMP were added. After an overall reaction time of 22 h (starting with addition of diisocyanate), the reaction mixture was cooled down to room temperature. The reaction mixture was poured into methanol. The precipitate was collected, and washed with three times with methanol and twice with diethylether. The obtained powder was dried at 5*10⁻² mbar for 3 hours.

In the solid state IR spectrum the characteristic signal for the oxazolidinone carbonyl group was observed at 1747 cm⁻¹.

In the solid state IR spectrum the characteristic signal for isocyanurate groups was not observed.

The content of the 5-oxazolidinone regioisomer was >95%.

Based on GPC analysis, the weight average molecular weight $M_w$ was 19013 g/mol with a polydispersity of 3.1.

The polyoxazolidinone compound was thermally stable until 370° C.

The glass transition temperature was 160° C.

Comparison

TABLE 5

Comparison of the results of Examples 6 and 14

| Example | Solvent | $M_w$ [g/mol] | $T_g$ [° C.] | $T_d$ [° C.] |
|---|---|---|---|---|
| 6 | TDC | 14115 | 173.8 | 381 |
| 14 | TDI | 19013 | 160 | 370 |

Examples 6 and 14 show that also different synthesis routes can be used to obtain polyoxazolidinone products according to this invention.

The invention claimed is:
1. A polyoxazolidinone compound corresponding to formula (I) formula (II) and/or formula (III)

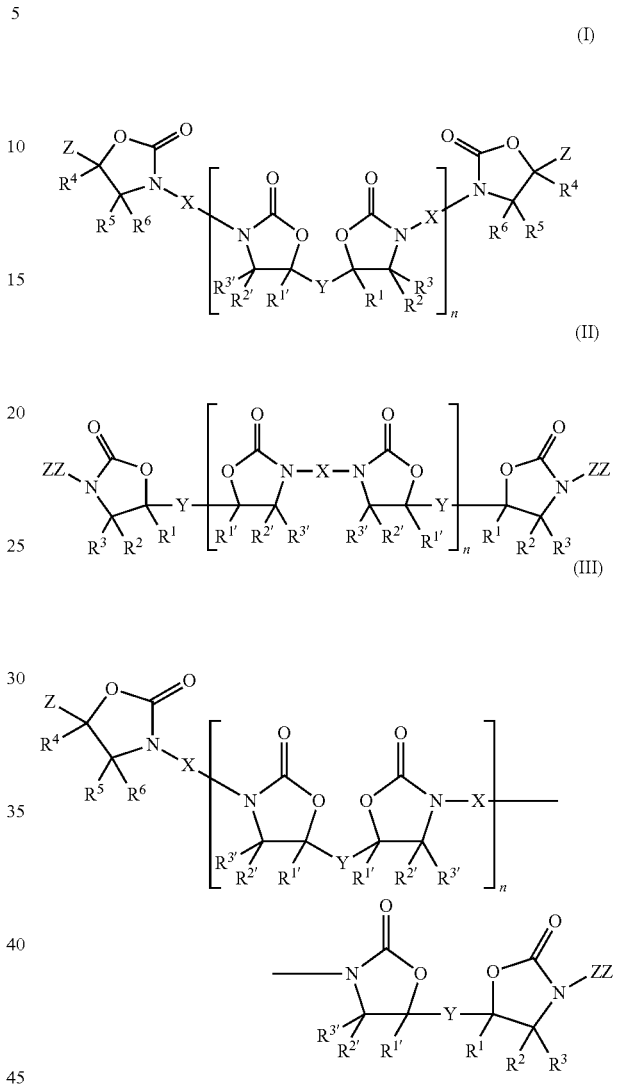

wherein
X represents methylene, dimethylene, trimethylene, tetramethylene, pentamethylene, hexamethylene, octamethylene, decamethylene or dodecamethylene, each of which is unsubstituted or is substituted with one or more heteroatom containing group, cyclohexylene, phenylene, diphenylene or dimethyl phenylene, each of which is unsubstituted or is substituted with one or more heteroatoms, 2-methylpentamethylene, 2,2,4-trimethyl-hexamethylene, dodecanemethylene, 1,2-cyclohexylene, 1,3-cyclohexylene, 1,4-cyclohexylene, 5-(1-methylene-(1,3,3-trimethylcyclohexane)), all regioisomers of methylene biscyclohexylene, all regioisomers of methylenebisphenylene, methylenebis-(3,3'-dimethylcyclohexane1,4-diyl), propane-2,2-diyl-bis(cyclohexane-4,1-diyl), propane-2,2-diyl-bis-4,1-phenylene, polyhexamethylene, tolylene, poly (propylene glycol) tolylene, poly(ethylene adipate) tolylene, 2,4,6-trimethyl-1,3-phenylene, 4-chloro-6-methyl-1,3-phenylene, poly [1,4-phenylene], co-poly (1,4-butanediol)], poly(tetrafluoroethylene oxide-codifluoromethylene oxide), 1,3-bis(1-methylethyl) benzene, 3,3'-dimethyl-4,4'-biphenylene, naphthalene, 1,2-phenylene, 1,3- phenylene, 1,4-phenylene 2,4- or 2,5- or 2,6- tolylene or mixtures of these isomers, methylene 4,4'- or 2,4'- or 2,2'- bisphenylene or mixtures of these isomers, 4,4'-, 2,4'- or 2,2'- 2,2-diphenylpropane-p-xylylene, or α,α,α',α'-tetramethyl- m- or -p-xylylene;

Y represents methylene, dimethylene, trimethylene, tetramethylene, pentamethylene, hexamethylene, heptamethylene, octamethylene, polyethylene, polyethyleneglycol, 1,2-cyclohexylene, 1,3-cyclohexylene, 1,4-cyclohexylene, 1,2-phenylene, 1,3-phenylene, 1,4-phenylene, 1,2-tolylene, 1,3-tolylene, 1,4-tolylene, 4,4'-methylenebis(4,1-phenylene), 4,4'-methylenebis(cyclohexane-4,1-diyl), 4,4'-(propane-2,2-diyl)bis(4,1-phenylene), propane-2,2-diyl-bis(cyclohexane-4,1-diyl), or Y can be represented by formula IV

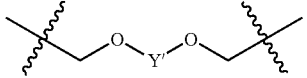

(IV)

wherein Y' represents methylene, dimethylene, trimethylene, tetramethylene, pentamethylene, hexamethylene, heptamethylene, octamethylene, polyethylene, polyethyleneglycol, 1,2-cyclohexylene, 1,3-cyclohexylene, 1,4-cyclohexylene, 1,2-phenylene, 1,3-phenylene, 1,4-phenylene, 1,2-tolylene, 1,3-tolylene, 1,4-tolylene, 4,4'-methylenebis(4,1-phenylene), 4,4'-methylenebis(cyclohexane-4,1-diyl), 4,4'-(propane-2,2-diyl)bis(4,1-phenylene), propane-2,2-diyl-bis(cyclohexane-4,1-diyl) or 4,4'-(3,3,5-trimethylcyclohexyliden)bisphenyl;

each Z independently represents hydrogen, methyl, ethyl, butyl, propyl, hexyl, heptyl, octyl, nonyl, decyl, dodecyl, C10- C18 alpha-olefins, ethylene, phenyl, unsaturated fatty acid C1 - C18 alkyl esters, methylene methyl ether, methylene ethyl ether, methylene propyl ether, methylene butyl ether, methylene pentyl ether, methylene hexyl ether, methylene cyclohexyl ether, methylene octyl ether, methylene 2-ethylhexyl ether, methylene C10 - C18 alkyl ether, methylene allyl ether, methylene benzyl ether, methylene phenyl ether, methylene 4-tert-butylphenyl ether, methylene 1-naphthyl ether, methylene 2-naphthyl ether, methylene 2-chlorophenyl ether, methylene 4-chlorophenyl ether, methylene 4-bromophenyl ether, methylene 2,4,6-trichlorophenyl ether, methylene 2,4,6-tribromophenyl ether, methylene pentafluorophenyl ether, methylene o-cresyl ether, methylene m-cresyl ether, methylene p-cresyl ether, methylene acetate, methylene cyclohexylcarboxylate, methylene benzoate, or N-methylene phthalimide;

each ZZ independently represents methyl, ethyl, n-propyl, isopropyl, n-butyl, isobutyl, tert-butyl, n-pentyl, n-hexyl, cyclohexyl, ω-chlorohexamethylene, n-heptyl, n-octyl, iso-octyl, 2-ethyl hexyl, 2-norbornyl methyl, nonyl, 2,3,4-trimethylcyclohexyl, 3,3,5-trimethylcyclohexyl, decyl, undecyl, dodecyl, tridecyl, tetradecyl, pentadecyl, hexadecyl, octadecyl, stearyl, 3-butoxypropyl, 3-(2-ethylhexyloxy)-propyl, 6-chlorohexyl, benzyl, phenyl, ortho-, meta-, para-tolyl, dimethylphenyl, 4-pentylphenyl isocyanate, 4-cyclohexylphenyl, 4-decylphenyl, ortho-, meta-, para-methoxyphenyl, chlorophenyl (2,3,4-isomers), the different dichlorophenyl isomers, 4-nitrophenyl, 3-trifluoromethylphenyl, or 1-naphthyl;

R1, R1', R2, R2', R3, R3', R4, R5, and R6 independent of one another represent hydrogen, chloride, bromide, fluoride, methyl, ethyl, propyl, n-propyl, isopropyl, n-butyl, isobutyl, 2-butyl, tert-butyl, hexyl, methoxy, ethoxy, butoxy, phenyl, methoxyphenyl, chlorophenyl, bromophenyl, nitrophenyl, cyclobutyl, cyclopentyl, cyclohexyl, or cycloheptyl, X, Y, Z, ZZ, R1, R1', R2, R2', R3, R3', R4, R5, R6 can be equal or different to each other, and n is an integer of ≥1.

2. A compound according to claim 1, wherein n is an integer of ≥2 and ≤2000.

3. A compound according to claim 1, wherein

X represents 4,4'-methylenebis(4,1-phenylene) or 2, 4-substituted tolylene;

Y represents 4,4'-(propane-2,2-diyl)bis(4,1-phenylene) or 1,3-phenylene;

Z represents hydrogen, methyl, ethyl, phenyl, methylene butyl ether, methylene benzyl ether, methylene phenyl ether, methylene p-tolyl ether, methylene 4-tert-butylphenyl ether or mixtures thereof;

ZZ represents benzyl, phenyl, ortho-, meta-, para-tolyl, dimethylphenyl, 4-cyclohexylphenyl, ortho-, meta-, para-methoxyphenyl or mixtures thereof;

R1, R1', R2, R2', R3, R3', R4, R5, R6 represent hydrogen.

4. A method for the production of a polyoxazolidinone compound according to claim 1, comprising reacting at least one biscarbamate with at least one bisepoxide, in the presence of A) a compound comprising a mono-carbamate group, a mono-isocyanate group and/or a mono-epoxide group and/or B) a base having a pK$_b$-value of ≤9.

5. A method for the production of a polyoxazolidinone compound according to claim 1, comprising reacting at least one diisocyanate compound with at least one bisepoxide compound, in the presence of A) a compound comprising a mono-carbamate group, a mono-isocyanate group and/or a mono-epoxide group, and/or B) a base having a pK$_b$-value of ≤9.

6. A method according to claim 4, wherein the reaction occurs at a temperature of ≥100° C.

7. A method according to claim 4, wherein the base B) has a pK$_b$-value of ≤7.

8. A method according to one of claim 4, wherein A) is a compound comprising a mono-carbamate group and/or a mono-epoxide group.

9. A method according to claim 4, wherein the biscarbamate is selected from the group consisting of N,N'-tetramethylene biscarbamate, N,N'-hexamethylene biscarbamate, N,N'-(2-methylpentamethylene) biscarbamate, N,N'-2,2,4-trimethyl-hexamethylene biscarbamate, N,N'-dodecanemethylene biscarbamate, N,N'-cyclohexane-1,4-biscarbamate, N,N'-isophorone biscarbamate, N,N'-(4,4'-methylenebis(cyclohexane-4,1-diyl)biscarbamate, N,N'-diphenylmethane biscarbamate, N,N'-(4,4'-methylenebis(2-methylcyclohexane-4,1-diyl))biscarbamate, (−)-N,N'-2,2-dicyclohexylpropane-4,4'-biscarbamate, N,N'-poly (hexamethylene biscarbamate), N,N'-octamethylene biscarbamate, N,N'-tolylene-α,4-biscarbamate, N,N'-poly (propylene glycol) tolylene-2,4-biscarbamate, N,N'-poly (ethylene adipate) tolylene-2,4-biscarbamate, N,N'-2,4,6-trimethyl-1,3-phenylene biscarbamate, N,N'-(4-chloro-6-methyl-1,3-phenylene) biscarbamate, N,N'-(poly[1,4-phenylene biscarbamate-co-poly(1,4-butanediol)]) biscarbamate, poly(tetrafluoroethylene oxide-co-difluoromethylene oxide) α,ω-biscarbamate, N,N'-butane-1,4-diylbiscarbamate, N,N'- (1-methylethyl)benzene-1,3-biscarbamate, N,N'-3,3'-dimethyl-4,4'-biphenylene biscarbamate, N,N'-naphthalene-1,5-biscarbamate, N,N'-1,3-phenylene biscarbamate N,N'-benzene-1,4-biscarbamate, N,N'-2,4- or N,N'-2,5- or N,N'-2,6-biscarbamatotoluene or mixtures of these isomers, N,N'-4,4'-, N,N'-2,4'- or N,N'-2,2'-biscarbamatodiphenylmethane or mixtures of these isomers, N,N'-4,4'-, N,N'-2,4'- or N,N'-2,2'-biscarbamato-2,2-diphenylpropane-p-xylene and α,α,α',α'-tetramethyl- m- or -p-xylene biscarbamate.

10. A method according to claim 4, wherein the bisepoxide compound is selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S diglcidyl ether, 9,9-bis(4-glycidyloxy phenyl) fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1 -C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidylether and diglycidyl isophthalate.

11. A method according to claim 5, wherein the diisocyanate compound is selected from the group consisting of tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 3-isocyanatomethyl-3,3,5-trimethylcyclohexyl isocyanate (isophorone diisocyanate, IPDI), 4,4'-diisocyanatodicyclohexylmethane ($H_{12}$-MDI), 4,4'-diisocyanato-3,3'-dimethyldicyclohexylmethane, 4,4'-diisocyanato-2,2-dicyclohexylpropane, poly(hexamethylene diisocyanate), octamethylene diisocyanate, tolylene-α,4-diisocyanate, poly(propylene glycol) tolylene-2,4-diisocyanate, poly(ethylene adipate) tolylene-2,4-diisocyanate, 2,4,6-trimethyl-1,3-phenylene diisocyanate, 4-chloro-6-methyl-1,3-phenylene diisocyanate, poly[1,4-phenylene diisocyanate-co-poly(1,4-butanediol)] diisocyanate, poly(tetrafluoroethylene oxide-co-difluoromethylene oxide) α,ω-diisocyanate, 1,4-diisocyanatobutane, 1,8-diisocyanatooctane, 1,3-bis(1-isocyanato-1-methylethyl)benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- or 2,6-diisocyanatotoluene (TDI) or mixtures of these isomers, 4,4'-, 2,4'- or 2,2'-diisocyanatodiphenylmethane (MDI) or mixtures of these isomers, 4,4'-, 2,4'- or 2,2'-diisocyanato-2,2-diphenylpropane-p-xylene diisocyanate, α,α,α',α'-tetramethyl- m- or -p-xylene diisocyanate (TMXDI), mixtures thereof and biurets, isocyanurates, carbamates or uretdiones of the aforementioned isocyanates.

12. A method according to claim 4, wherein said mono-carbamate, said mono-isocyanate and/or said mono-epoxide is selected from the group consisting of N-phenyl carbamate, N-(o-tolyl) carbamate, N-(p-tolyl) carbamate, N-(4-chlorophenyl) carbamate, N-(1-naphthyl) carbamate, N-(2-naphthyl) carbamate, N-cyclohexyl carbamate, N-methyl carbamate, N-ethyl carbamate, N-(n-propyl) carbamate, N-isopropyl carbamate, N-butyl carbamate, N-pentyl carbamate N-hexyl carbamate and/or N-octyl carbamate, and/or phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, C10 - C18 alkyl glycidyl ether, allyl glycidyl ether, ethylene oxide, propylene oxide, styrene oxide, 1,2-butene oxide, 2,3-butene oxide, 1,2-hexene oxide, oxides of C10 -C18 alpha-olefines, cyclohexene oxide, vinylcyclohexene monoxide, limonene monoxide, butadiene monoepoxide and/or N-glycidyl phthalimide and/or n-hexylisocyanate, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanatate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3 - (2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanate, 4-cyclohexyl-phenyl isocyanate, 4-pentyl-phenyl isocyanate, 4-t-butyl phenyl isocyanate, 1-naphthyl isocyanate, preferably N-(p-tolyl) carbamate, 4-tert-Butylphenylglycidylether and p-tolyl isocyanate.

13. A method according to claim 4, wherein the molar ratio of the bisepoxide compound relative to biscarbamate compound is in the range from 1:2 to 2:1.

14. A method according to claim 4, wherein the ratio r is in the range of ≥1.9 to ≤2.1, and is calculated according to the formula:

$$r=|n_{regulator}/(n_{bisepoxide}-n_{biscarbamate})|,$$

wherein:
$n_{regulator}$ represents the molar amount of A) a compound comprising a mono-carbamate group, a mono-isocyanate group and/or a mono-epoxide group;
$n_{bisepoxide}$ represents the molar amount of bisepoxide; and
$n_{biscarbamate}$ represents the molar amount of biscarbamate.

15. A method according to claim 5, wherein the reaction occurs at a temperature of ≥100° C.

16. A method according to claim 5, wherein the base B) has a $pK_b$-value of ≤7.

17. A method according to one of claim 5, wherein A) is a compound comprising a mono-carbamate group and/or a mono-epoxide group.

18. A method according to claim 5, wherein the bisepoxide compound is selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S diglcidyl ether, 9,9-bis(4-glycidyloxy phenyl) fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1 - C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidylether and diglycidyl isophthalate.

19. A method according to claim 5, wherein said mono-carbamate, said mono-isocyanate and/or said mono-epoxide is selected from the group consisting of N-phenyl carbamate, N-(o-tolyl) carbamate, N-(p-tolyl) carbamate, N-(4-chlorophenyl) carbamate, N-(1-naphthyl) carbamate, N-(2-naphthyl) carbamate, N-cyclohexyl carbamate, N-methyl carbamate, N-ethyl carbamate, N-(n-propyl) carbamate, N-isopropyl carbamate, N-butyl carbamate, N-pentyl carbamate N-hexyl carbamate and/or N-octyl carbamate, and/or phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, C10 - C18 alkyl glycidyl ether, allyl glycidyl ether, ethylene oxide, propylene oxide, styrene oxide, 1,2-butene oxide, 2,3-butene oxide, 1,2-hexene oxide, oxides of C10 -C18 alpha-olefines, cyclohexene oxide, vinylcyclohexene monoxide, limonene monoxide, butadiene monoepoxide and/or N-glycidyl phthalimide and/or n-hexylisocyanate, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanatate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3 - (2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentyl-phenyl isocyanate, 4-t-butyl phenyl isocyanate, 1-naphthyl isocyanate, preferably N-(p-tolyl) carbamate, 4-tert-Butylphenylglycidylether and p-tolyl isocyanate.

\* \* \* \* \*